United States Patent [19]

Grabowski et al.

[11] Patent Number: 5,261,282
[45] Date of Patent: Nov. 16, 1993

[54] METHOD AND APPARATUS FOR MONITORING A CONTINUOUS COOKING PROCESS BASED ON PARTICULATE RESIDENCE TIME

[75] Inventors: Paul P. Grabowski, Mt. Prospect, Ill.; George Dan, Stamford, Conn.; Elizabeth M. Parker, Arlington, Mass.

[73] Assignee: Kraft General Foods, Inc., Northfield, Ill.

[21] Appl. No.: 845,226

[22] Filed: Mar. 3, 1992

[51] Int. Cl.⁵ .......................... G01F 1/708
[52] U.S. Cl. .................. 73/861.05; 99/342; 426/231
[58] Field of Search ............ 73/861.05, 861.06, 865.9; 426/231, 233; 99/342; 324/306

[56] References Cited

U.S. PATENT DOCUMENTS

| | | | |
|---|---|---|---|
| 2,631,242 | 3/1953 | Metcalf . | |
| 3,184,967 | 5/1965 | Rogers | 73/861.05 X |
| 3,366,952 | 1/1968 | Mori . | |
| 3,419,795 | 12/1968 | Genthe et al. | 73/861.05 X |
| 3,512,410 | 5/1970 | Vander Heyden | 73/861.05 |
| 3,551,794 | 12/1970 | Vander Heyden et al. | 324/306 |
| 3,559,044 | 1/1971 | Vander Heyden | 73/861.05 X |
| 3,745,569 | 7/1973 | Works et al. | 343/6.555 |
| 4,588,880 | 5/1986 | Hesser | 235/376 |
| 4,627,294 | 12/1986 | Lew | 73/861.05 |
| 4,629,987 | 12/1986 | King et al. | 324/306 |
| 4,689,560 | 8/1987 | Nayler et al. | 324/306 |
| 4,841,244 | 6/1989 | Chambers | 324/204 |
| 4,992,794 | 2/1991 | Brouwers | 342/51 |
| 4,993,365 | 2/1991 | Weerstra | 73/861.05 X |
| 5,022,274 | 6/1991 | Klinzing et al. | 73/861.04 |

FOREIGN PATENT DOCUMENTS

| | | | |
|---|---|---|---|
| 251617 | 11/1987 | Fed. Rep. of Germany | 73/861.05 |
| 23410 | 2/1980 | Japan | 73/861.06 |
| 197473 | 12/1982 | Japan | 73/861.05 |
| 4437 | 12/1983 | PCT Int'l Appl. | 73/861.06 |
| 195655 | 7/1967 | U.S.S.R. | 73/861.05 |
| 1143978 | 3/1985 | U.S.S.R. | 73/861.05 |

OTHER PUBLICATIONS

Dignan, D. M., et al., "Safety Considerations in Establishing Aseptic Processes for Low-Acid Foods Containing Particulates," Food Technology, Mar. 1989, pp. 118-121 and 131.
Bernard, D. T., et al., "Validation of Aseptic Processing and Packaging," Food Technology, Dec. 1990, pp. 119-120, 122.
"Texas Instruments Registration and Identification Systems," product brochure, Texas Instruments, Inc., 1990. 7 pages & 8 pages 1991.
"Texas Instruments Enters Automatic Identification Market with Worldwide Introduction of TIRIS System," Texas Instruments News Release TIR104, Mar. 21, 1991. 4 pages.
"Cesco Remagtrap" brochure, Cesco Corp., Rohnert Park, Calif., Bulletin 130A 2 pages; pub. by Nov. 7, 1991.
"TIRIS (Texas Instruments Registration & Identification Systems)", preliminary product brochure, Texas Instruments, publication date unknown. but by May 1992, 12 pages.

Primary Examiner—Tom Noland
Attorney, Agent, or Firm—Fitch, Even, Tabin & Flannery

[57] ABSTRACT

A method and apparatus for monitoring the residence time of food particles in a continuous flow process utilizing simulated food particles, each including a transponder having a predetermined identifying signal, to be subjected to the process along with the actual food particles. The method and apparatus relates to a continuous pasta cooking process in which a transponder in a simulated product emits an identifying signal received at various stations along the process to indicate the time of passage between the stations.

9 Claims, 2 Drawing Sheets

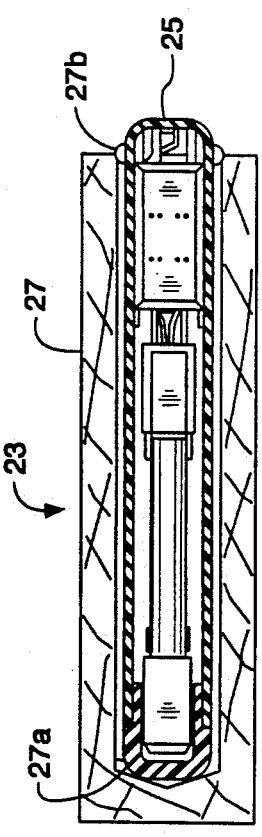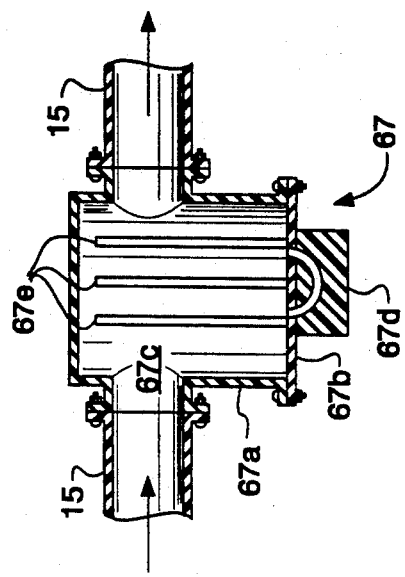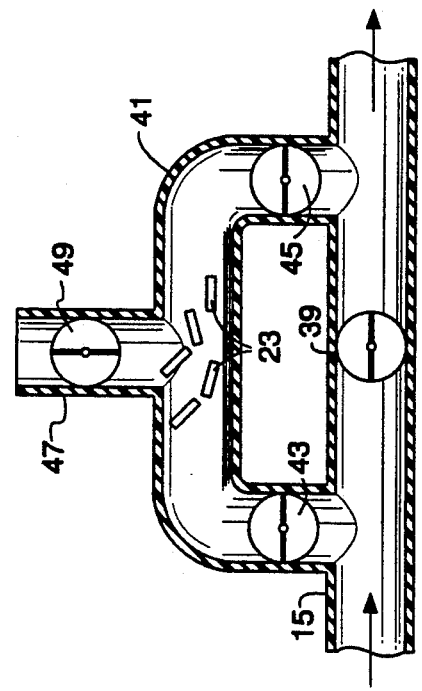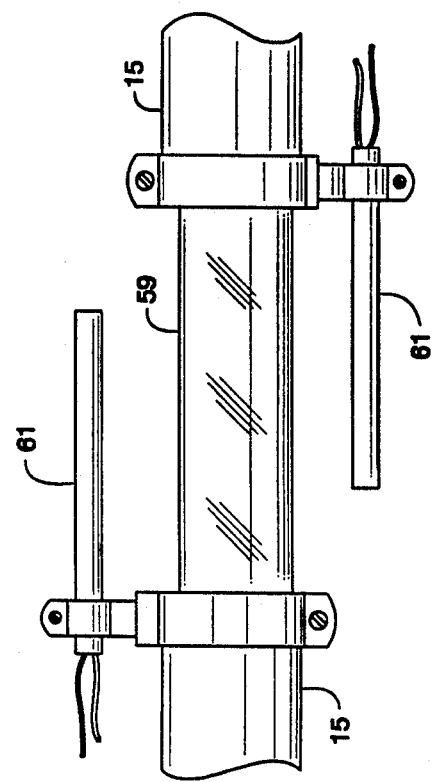
Fig. 4
Fig. 5
Fig. 2
Fig. 3

METHOD AND APPARATUS FOR MONITORING A CONTINUOUS COOKING PROCESS BASED ON PARTICULATE RESIDENCE TIME

BACKGROUND OF THE INVENTION

The present invention relates generally to continuous food processing apparatus and more specifically to monitoring of food processes and apparatus for processing particulate food products.

It has been well known in batch cooking processes that it is important to heat food to a certain temperature level and maintain the food at that temperature level to eliminate certain potentially harmful bacterial contamination. After such processing, the food may be sealed from the atmosphere in a can or jar and preserved at room temperature for consumption months after preparation. As consumer demand for precooked foods has increased, the manufacturers of such foods have developed new processes and packages. Included among these precooked foods are various pasta products which are precooked and packaged in plastic bags, cups and the like, with preparation involving only heating for a relatively short time. In order to reduce manufacturing costs, it has been common to cook such food products in continuous processes in which the products are cooked in a continuously flowing stream never being exposed to the atmosphere between the cooking and final sealing into a leak-tight package.

While it is relatively easy to operate a batch process to assure cooking times at particular temperatures, the task becomes more difficult in a continuous process because of the changing conditions to which each product is subjected. One approach has been to overcook all of the products going through this continuous process in order to guarantee that all processed products receive the minimum necessary amount of cooking. This approach is considered unsatisfactory since the product is less appealing to the consumer and the additional processing adds cost to the product. Accordingly, it is often of interest to determine accurately the residence time of a food product within a cooking process to ascertain that the product has received minimum required amount of heat to destroy harmful bacteria.

In the processing of particulate food products such as pasta, including macaroni, it is often important to have information on the residence time of the particulate food products in order to control the process properly. The determination of residence time in processes in which products are conveyed in a fixed order one after another is relatively simple, being dependent on a conveyor speed or the rate of flow through the process. However, there are many processes involving flowing streams of particulate products wherein the individual pieces may have different residence times in the process as a consequence of the turbulence in the flow or of the variation in stream velocity at one point as compared to another such turbulence and variations in velocity result in some pieces leapfrogging other pieces and moving through the process much faster than others, producing a wide variation in residence times for pieces moving through the same process. In such processes involving streams of particulate products, attempts have been made to measure residence time by visually monitoring the passage of identifiable specimens mixed in with the particulate products being processed. This approach is not satisfactory since it is time consuming and subject to error at best, and is completely impractical and unusable in many processes. In most cooking processes involving streams of food particles, it is impossible to make meaningful measurements of residence times of individual particles based on visual monitoring.

Another currently used method of measuring residence time is to place magnetized particles in the stream that may be sensed by coils as they pass monitoring stations. This method provides no means of identifying specific samples and leads to possible mistakes due to the leapfrog effect of the magnetized particles. There are further problems in providing magnetizable particles to be monitored.

A third possible method of checking residence time in a cooling process involves introducing into the process spores of the bacteria which is to be killed in the cooking process. The output of the process is then sampled and checked to determine if the spores have been destroyed. This approach to verifying the effectiveness of a process in destroying bacteria is discussed at length in an article entitled "Safety Considerations in Establishing Aseptic Processes for Low-Acid Foods Containing particulates" appearing in the March 1989 issue of *Food Technology*. While the use of bacteria spores as discussed in this article is a useful tool in evaluating the effectiveness and safety of a process, it has many shortcomings and is complicated to implement effectively. In addition, it provides no direct measurement of residence time of particles in the process and how such residence times vary.

In the cooking of pasta for sale as a precooked food, the pasta is typically circulated through a pipe having a diameter of 2 or 3 inches, with the pasta being transported in an liquid solution. Heaters are disposed along the pipe; and after bringing the slurry of the pasta up to a cooking temperature, it continues to be circulated through a tortuous conduit where the slurry maintains its temperature and continues to be cooked. Thereafter, there are cooling stages in which the temperature of the slurry is lowered and then the product is inserted into sterilized packages without ever being exposed to the atmosphere where it might pick up bacterial contamination. The problem of measuring the residence time of pasta in such a process is very substantial.

The flow of the pasta through the pipe or conduit is difficult to predict, varying between so-called "plug flow", in which the mass moves at a uniform velocity across the diameter of the pipe, and normal liquid flow pattern, in which the flow at the center is the maximum velocity decreasing toward the walls of the pipe where the velocity is the minimum. It is useful to determine not only the residence time of the fastest moving food particle in the process, but also the spread or range of residence times. The fastest or shortest residence time allows one to adapt the process to provide the minimum acceptable cooking, by a combination of time and temperature level, to satisfy the requirements with respect to elimination of harmful bacteria. By determining the spread or distribution of residence times between the shortest residence time and the longest allows for the evaluation of the process to consider the amount of over-processing to which the longer residence food products are subjected. There are no methods or apparatus currently available that would provide residence times on food particles, such as pieces of pasta, passing through a continuous cooking process as described above.

The various types of bacteria which the cooking process must be designed to kill are salmonella, clostridium botulinum and other mesophilic and thermophilic spore-forming spoilage organisms. The risk from these harmful bacteria is increased when the precooked foods are low acid foods such as pasta. The nature of this risk is discussed in the above cited article from *Food Technology* as well as an article entitled "Validation of Aseptic Processing and Packaging" appearing at pages 119-122 in the December 1990 issue of *Food Technology*. The article from the March 1989 issue of *Food Technology* discusses the importance of determining residence times in such cooking processes. The following statements are quoted from page 119 of the March 1989 article on Safety Considerations In Establishing Aseptic Processes for Low-Acid Foods Containing Particulates:

> Any process establishment data for particulate processes must include detailed studies on particle residence times in both the heat exchanger (if applicable) and the holding tube of the commercial system. Tests should be conducted using the actual food product flowing steadily through the system.

From the foregoing, it is evident that there are major health and safety risks involved in bacterial contamination of low acid foods such as pasta that are cooked in a continuous process, and that accurate measurement of particle residence times is critically important to the elimination of such risks.

There have been various attempts at measuring flow velocity of a stream by sensing the rate of movement of an element that has been tagged or marked in some way. The U.S. Pat. No. to King et al., No. 4,627,987 teaches the use of a magnetic field imposed on a flowing material as a tag to sense the rate of movement of a stream of material. The U.S. Pat. No. to Lew, No. 4,627,294 shows the use of an eddy generator to create a turbulence the progress of which is used to measure the velocity of the stream through a conduit.

Similar approaches for measuring velocity of fluid flow in pipelines are shown in Metcalf U.S. Pat. No. 2,631,242, which uses a radioactive isotope as a trace means, and Klinzing et al. U.S. Pat. No. 5,022,274, which charges particles in an air stream and senses the transit time of the charged particles to determine velocity. None of these approaches would be useful to sense the residence time of individual pieces in a stream of particulate products.

There are teachings in the prior art as to the use of transponder sensing means to locate or follow the progress of articles through a process or along a route of travel. In this connection, the U.S. Pat. Nos. to Hesser No. 4,588,880, Mori No. 3,366,952, and Works No. 3,745,569 are noted of interest.

At the present time, Texas Instruments Incorporated is marketing a system including miniature transponders with sensing and reading means designed for manufacturing and shipping applications for object tracking, for security and for animal identification. In connection with manufacturing applications, Texas Instruments suggests that its transponders may be placed on or within a product, product package or shipping container to provide data for process automation and statistical process control.

Many food processes and particularly food cooking processes are very dependent on the residence time of the product in each of a number of stages of the process and on the temperatures to which the product is subjected during each of these stages of the process. In the cooking of particulate material being processed in a continuous stream having turbulent conditions and particles in the stream moving at different velocities, there is no known method or apparatus for tracking a number of individual particles to provide a range of residence times in the various stages of the process. This lack of means for determining residence times for the various particles in the stream in various stages of the process requires that the entire stream be over-processed to assure that a certain minimum processing has been achieved for all particles in the stream. If a more accurate means of measuring the range of residence time that would be expected in the various stages of the process were available, it would be possible to avoid over-processing and to assure accurate processing in a minimum amount of time. There are some types of cooking processes which require that food be cooked for a certain period of time at a certain temperature to meet established health and safety standards in order to destroy harmful bacteria as discussed above. The cooking time may be shortened to some extent by increasing the temperature. In order to meet these requirements, the food processor must maintain records of the operating times and temperatures for the process and be in a position to show that his process was operating within the established standards.

Accordingly, it is an object of the present invention to provide an improved means for determining residence time of particulate material in a process involving a continuous stream of such particulate material.

SUMMARY OF THE INVENTION

The method and apparatus of the present invention utilizes a plurality of miniature transponders, each of which is adapted to simulate a particulate food product to be cooked in a continuous stream process. The transponders are housed in an enclosure which is designed so that the assembly has the same size and density of the product with which it is processed. The simulated article including the transponder is subjected to the same processing steps as the actual articles with which it is commingled in the processing stream. The transponders are adapted to emit a coded identifying signal which is received by a sensing system to provide residence time data on each transponder as it moves through the process along with the actual products. Each simulated product along with its transponder is subject to the same turbulence and varying velocity conditions as the actual products. This residence time data accumulated for a number of simulated articles may be used to prove that a process provides the required cooking for all of the particulate food products. In a pasta cooking process, the pieces of pasta must be held at a temperature of over 250° F. for several minutes, depending upon the actual temperature, to kill any harmful microorganisms. The uncooked pasta is immersed in a liquid stream and pumped through a conduit having scrape surface heaters to raise the temperature of the liquid and pasta to over 250° F. The liquid stream carrying the pasta is then passed through a holding section where the pasta continues to cook at an elevated temperature. Thereafter, the stream is cooled in a cooling section of conduit and then aseptically filled into hermetically sealed packages.

An insertion station is provided to permit easy insertion of the simulated pasta upstream of the first transponder monitoring station In addition, a transponder trap is positioned downstream of the holding section to recover the transponder from the processing stream and to separate the simulated products from the actual products.

Although the method and apparatus of the present invention is disclosed as applied to a pasta or macaroni cooking process, it is also applicable to other continuous processes in which it is desirable to track individual products which are mixed together and not moving in a fixed order through the process. The concept of providing a simulated product equipped with a transponder and subjecting the simulated product to the same processing steps and random movement with the actual products may easily be applied to such other continuous processes.

Accordingly, it is an object of the present invention to provide improved method and apparatus for measuring the residence time of a product in a continuous process using a simulated product equipped with a transponder emitting an identifying signal.

It is a further object of the present invention to provide improved method and apparatus for tracking a product mixed with a group of products moving in a non-ordered manner through a process using a simulated product equipped with a transponder.

It is another object of the present invention to provide improved method and apparatus for determining the residence time of macaroni in a continuous cooking process using transponders enclosed with similar pieces of macaroni, the transponders emitting identifying signals.

BRIEF DESCRIPTION OF THE DRAWINGS

These and other objects and advantages of the invention will become apparent from the following detailed description taken in connection with the accompanying drawings in which:

FIG. 2 is a sectional view of a simulated food product utilized in the apparatus of FIG. 1;

FIG. 3 is a plan view of the transponder injection portion of the apparatus of FIG. 1;

FIG. 4 is a sectional view of the transponder separator or trap as utilized in the apparatus of FIG. 1; and FIG. 5 is a plan view of one of the transponder monitoring stations as utilized in the apparatus of FIG. 1.

DETAILED DESCRIPTION OF THE PREFERRED EMBODIMENT

Figure 1:
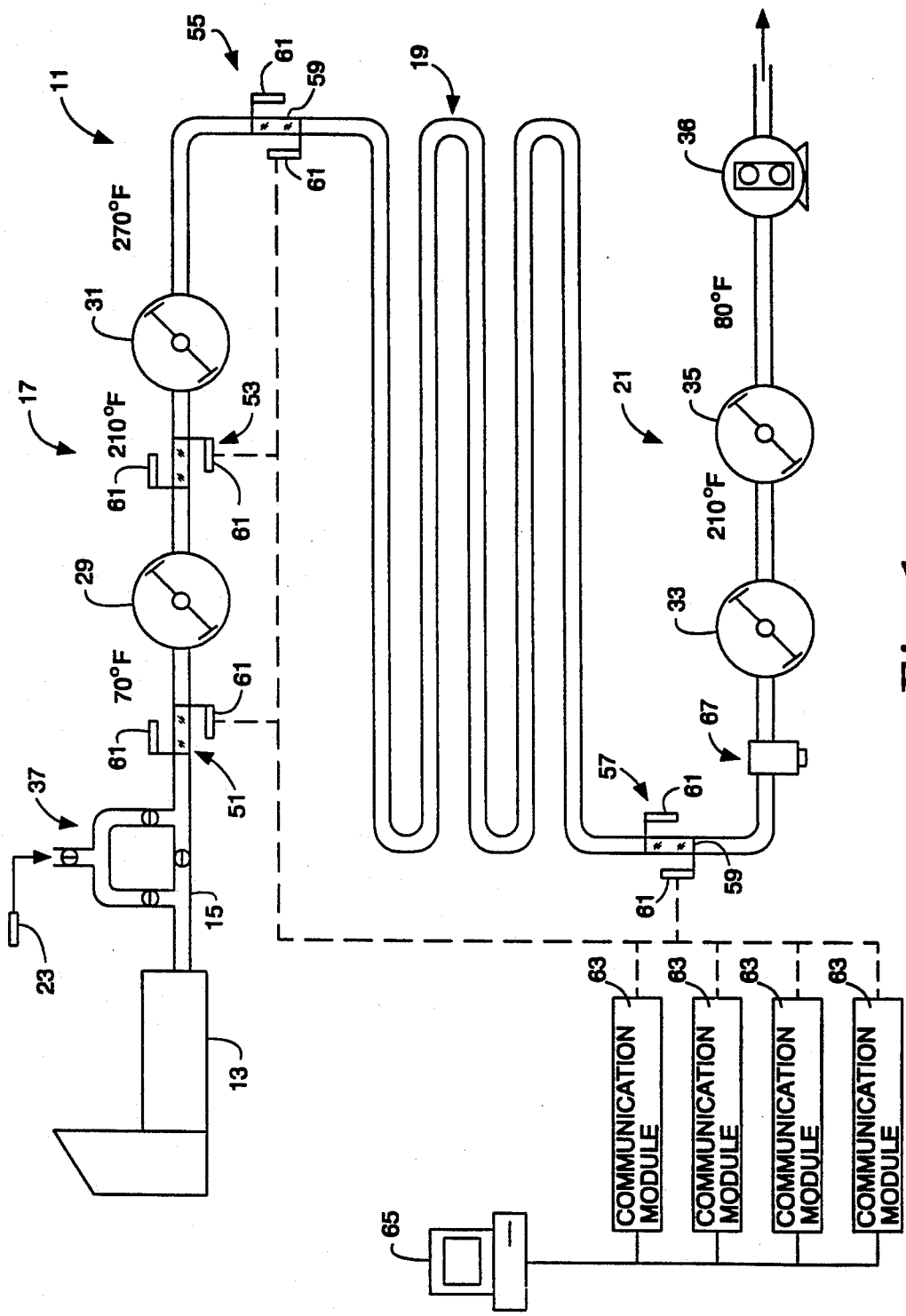
FIG. 1 is a schematic diagram of a pasta cooking apparatus embodying the present invention.

In the implementation of the method and apparatus of the present invention, a small sealed transponder is utilized. As stated above, it is well known in the art to use transponders to aid in the identification of products in a manufacturing process. Through the use of integrated circuit technology, it has been possible to make small transponders on the order of an inch long and 0.14 inch in diameter including the antenna. Such transponders are available commercially through Texas Instruments Incorporated and have the capability of producing a radio frequency signal which is individually coded to provide a twenty digit identifying number. The transponders have no internal source of power and are activated by an external reader which also receives the transponders' signal and which may then identify the individual transponder and record the time at which the transponder signal was received. The transponders and the related identification and data recording systems are marketed by Texas Instruments under its trademark TIRIS. The U.S. Pat. No. 4,992,794 to Brouwers is directed to one such transponder.

The preferred method and apparatus of the present invention is described in connection with a process for cooking macaroni. It should be understood that the invention has broad application to any continuous manufacturing processes in which the residence times of commingled products in a stream are difficult to determine by known means. In many continuous cooking processes, the items of food being cooked are transported through the process in a stream enclosed by the processing equipment so as to make visual observation of items of food in the process impossible. In any of those cooking processes in which it is necessary to follow the progress of individual items, the present invention provides important advantages.

Shown schematically in FIG. 1 is apparatus 11 for the continuous cooking of pasta and more specifically, macaroni. As consumer demand has increased for prepared and precooked foods of all kinds, the marketers of such foods have had to adapt their processing methods to meet this demand. In addition, to reduce costs and improve efficiency, it is often necessary to adopt continuous processing in place of the batch processing that had been in more general use. The change to continuous processing of foods introduces problems relating to the elimination of harmful bacteria that may be present in many foods. These bacteria are killed by processing foods at an elevated temperature for a prescribed period of time.

In batch processing of food, it is relatively easy to provide a cooking method which will achieve these times and temperatures to kill these bacteria. However, a problem with a continuous process relates to the fact that the temperatures vary at different stages of the process and it therefore becomes difficult to determine the exact time the food remains at any of these various temperatures. This problem is further complicated in continuous cooking processes in which the food is in the form of small particles or pieces that may not all pass through the process at the same rate as a consequence of the turbulent and swirling nature of the stream in which the products are transported through the process.

The apparatus 11 is exemplary of a continuous cooking process in which food particles such as macaroni are cooked in a flowing stream. The stream comprises a slurry of macaroni in a liquid solution which flows through the apparatus 11 beginning at a pump 13 where the macaroni and liquid solution are fed into a hopper from which the pump draws, forcing the stream into the end of an elongated pipe 15. The pump 13 maintains a pressure of 40 to 60 psi within the pipe 15 to move the liquid slurry through the pipe. The size of the pipe is determined by the production volume but would normally be two to three inches in diameter, and extends through a multi-stage cooking portion 17, an elongated holding portion 19 and a cooling portion 21.

In order to monitor the progress of macaroni passing through the apparatus 11, there is provided a simulated product 23 which consists of a sealed transponder 25 enclosed within a housing 27. The housing 27 comprises a ⅜ inch wooden dowel which has an internal passageway 27a drilled therein to receive the transponder 25. The transponder extends slightly from the passageway 27a and a high temperature sealant is applied at 27b to restrict liquid from entering the passageway 27a. The purpose of the housing 27 is to provide an enclosure for the transponder 25, which results in the combination of the housing 27 and transponder 25 having a size and density which corresponds closely to the size and density of the product involved in the process, in this case, a piece of macaroni. Macaroni, when placed in the liquid solution in which it is processed has a neutral buoyancy tending to float partially submerged. By selecting an enclosure or housing material for the transponder 25 which has a positive buoyancy, the assembly of the two in the simulated product may be designed to have the desired neutral buoyancy.

It has been found that a piece of ⅜ inch wood dowel supplies the necessary buoyancy so that the assembly is neutrally buoyant with respect to the processing liquid solution. The housing 27 is painted so that the wood does not absorb the liquid solution in which it is to be placed. The housing 27 could also be formed of a suitable plastic either of low density or having suitable flotation cavities formed in the walls thereof to achieve the desired buoyancy effect.

Before the manner in which the simulated products are introduced into the process and monitored is discussed, the conventional elements of the processing apparatus will be described. The first such processing element downstream of the pump 13 is the cooking portion 17 which includes two scraped surface heaters 29 and 31 shown schematically in FIG. 1. The scraped surface heaters are available commercially through suppliers of food processing equipment and comprise a heated tube through which the stream of macaroni in the liquid solution passes. The stream of macaroni is contained in an inner tube surrounded by a second tube enclosing a heated fluid. Mounted coaxially within the inner tube is a rotating scraper which continuously scrapes the wall of the inner tube and thus moves the macaroni away from the heat exchange surface. This scraping action prevents the product from sticking or adhering to the heat exchange surface on the inner tube. The heaters 29 and 31 raise the temperature of the product stream in two stages from 70° F. to about 210° F. and then to 270° F.

The product stream enters the holding portion 19 after leaving the heater 31. The holding portion 19 comprises an elongated pipe which is designed to maintain the moving product stream at an elevated temperature during a time necessary to complete the cooking of the macaroni The temperature of the product stream drops slightly during the period in the holding portion 19 with the temperature being about 265° F. on leaving the holding portion.

Upon leaving the holding portion 19, the product stream passes into the cooling portion 21 which includes two scraped surface coolers 33 and 35. The scraped surface coolers are similar in construction to the heaters 29 and 31 but have a cooling medium passing around the inner product containing tube rather than the heating medium or fluid used in heaters 29 and 31. At the output of the second cooler 35, the temperature of the product stream is on the order of 80° F.

Following the cooling portion 21, there is provided a pump 36 which provides a back pressure to maintain the pressure created by pump 13 to force the slurry through the pipe 15. The pump 36 is conventional in its form and operation in maintaining the back pressure on the system.

After being cooled, the macaroni is then placed in sterilized containers while preventing exposure to the atmosphere. The foregoing process has the capacity to produce a product in which all harmful bacteria have been eliminated and which, as a consequence, may be stored at room temperature without spoilage for a substantial period of time. If this objective is to be achieved, however, the process must be set up so that the fastest particle of food moving through the apparatus will receive the minimum required cooking to kill the harmful bacteria In this and other processes in which the products are mixed and not processed in order, it is extremely difficult to obtain any accurate picture of the residence times of the products within the process as well as an estimate of the range of residence times.

The simulated product 23 described above in connection with FIG. 2 represents a product created to match closely the appearance and density of an actual piece of macaroni. There are instances in which the simulated product may be altered from the actual product to provide residence times of a select class of the group of products being processed. For example, the simulated product may be altered so as to move with the fastest traveling product. Tests have been run with a simulated product in the apparatus 11, in which buoyancy means was applied only to one end of the transponder 25 so that it would float with one end up and one down. With this configuration the simulated product tended to move with the fastest part of the product stream producing useful but less representative residence time data, since actual products may not remain in the fastest moving part of the stream throughout the process.

In the method and apparatus of the present invention, the simulated product 23 including the transponder 25 provide the means of tracking individual products or, more accurately, simulated products through the process. By processing a sufficient number of the simulated products and monitoring the times for the various stages, one may determine the variation in residence times to permit establishing an accurate estimate of the fastest time through the process.

To permit insertion of the simulated products 23 downstream of the pump 13 to avoid damage by the pump, there is provided an injection station 37 shown best in FIG. 3. Included in the injection station 37 is a valve 39 in the pipe 15, which valve is intended to divert flow of the product stream into a bypass leg 41. The bypass leg 41 is connected to pipe 15 upstream and downstream of the valve 39. Flow through the bypass leg 41 is controlled by valves 43 and 45 which are located adjacent to the connection between the bypass leg 41 and the pipe 15. In the mid-point of the bypass leg 41, there is provided an injection port 47 which is closed by a valve 49.

In order to commence the insertion of simulated products 23 into the product stream, the valves 39, 43, 45 and 47 are positioned as shown in FIG. 3 so that the simulated products 23 may be inserted as shown into the bypass leg 41 through the port 47. After the simulated products have been so inserted, the valve 49 is closed and the valves 43 and 45 are opened. When the valve 39 is closed, the product stream is diverted through the bypass 41, thus introducing the simulated products 23 into the product stream Valves 43 and 45 are then closed and valve 39 is reopened to return flow of the product stream to the pipe 15 rather than through the bypass 41. The opening and closing of the valves 39, 43 45 and 49 can be done by automatic controls to minimize the interval of disruption of normal flow through the pipe 15.

The monitoring of the progress of the simulated products 23 through the apparatus 11 requires monitoring stations along the pipe 15 to sense the passage of each individual simulated product 23. As shown in FIG. 1, there are four monitoring stations 51, 53, 55 and 57 which are located prior to the heater 29, between the heaters 29 and 31, upstream of the holding portion 19, and downstream of the holding portion 19, respectively. Although most of the cooking of the product is accomplished during the period in the holding portion 19, between monitoring stations 55 and 57, there is cooking performed within the heaters 29 and 31, and monitoring the residence times therein is useful in an analysis of the process.

Since the pipe 15 is conventionally formed of stainless steel or other metal which would block radio frequency signals to and from the transponders 25, the pipe 15 is formed with a window portion 59 which may be formed of glass or a heat resistant, reinforced plastic and which is a cylindrical section connected into the pipe 15, as shown in FIG. 5. If the window portion 59 is to be made of plastic, it would preferably have a Teflon inner portion surrounded by a high temperature plastic to support the inner portion. Positioned on opposite sides of the window portion 59 are a pair of antennas 61 which are connected to communication modules 63. The two diametrically spaced antennas 61 are used at each station in order to guarantee good transmission between the communication modules and the transponders 25. Regardless of where the simulated product 23 and its transponder 25 are within the product stream when it passes the monitoring station, there will be an antenna within about 4 inches of the transponder 25. As each transponder passes a monitoring station, a radio signal from the two antennas causes the transponder to transmit its identifying signal which is picked up by the antennas 61 and communication modules 63. The time that each individual simulated product passes each monitoring station is then recorded in a computer 65, providing the data for computing the residence time of the various simulated products for the travel between the various monitoring stations.

In running a test to establish residence time data for the apparatus 11, a plurality of simulated products 23, on the order of 15 to 20, are inserted into the product stream at the injection station 37 by introducing them into the port 47 through the open valve 49. Valve 49 is then closed and then valves 43 and 45 are opened and valve 39 closed to propel the simulated products 23 into the product stream in the pipe 15. All of the transponders from the inserted simulated articles are immediately sensed as they arrive at monitoring station 51, providing data to the computer 65 as to the starting time of each individual transponder through the apparatus 11. Thereafter, similar time data will be recorded for each transponder as it arrives at the respective monitoring stations 53, 55 and 57. The data obtained on the plurality of transponders 25 will indicate the variations in the residence time through the various stages of the process and through the process as a whole. This data will then provide the necessary evidence to show whether or not the process is operating in a manner that will destroy harmful bacteria within the macaroni It will also allow the process to be fine tuned to eliminate any unnecessary overcooking of the macaroni that might otherwise be required to assure that the cooking had been sufficient to destroy harmful bacteria It is then possible to increase or decrease the speed of the product stream to obtain the appropriate residence time to assure that all of the harmful bacteria will be destroyed with a minimum amount of overcooking.

At the end of the cooking process and before the cooling of the product stream, the simulated products 23 are separated and removed from the product stream by a separator 67 which is a magnetic trap. Such traps are commercially available through Cesco of Rohnert Park, Calif., being sold Under the trademark REMAG-TRAP. As shown in FIG. 4, the separator 67 is mounted in the pipe 15, and includes a housing portion 67a with a sealed removable wall 67b which forms a closure for the cavity 67c. Externally of the cavity 67c, there is mounted a permanent magnet 67d which magnetizes a plurality of ferromagnetic fingers 67e that extend into the product stream passing through pipe 15. As the product stream passes through the separator 67, the simulated products 23 are attracted to the magnetized fingers 67e and are retained in the separator 67. The simulated products 23 have a tendency to move downwardly in the cavity 67c. When the process is shut down, the removable wall 67b may be disassembled from the housing portion 67a to recover the simulated products 23.

While the disclosed embodiment is directed to a simulated article 23 which is structured to resemble a piece of macaroni in density, shape and flow characteristics for use in measuring residence time in a macaroni cooking process, it should be understood that the invention has application to other processes in which a transponder 25 may be embodied in a simulated product which is to be cooked or otherwise processed. Thus, in any process involving products which are commingled and not processed in order, it may be necessary to periodically identify individual products on the basis of time and location. Where because of numbers or other aspects of the process, the location and identification of the individual products passing through the process cannot be accomplished visually, the present invention using a transponder equipped simulated product provides a unique solution.

The present invention has a number of significant advantages over any residence time measuring approaches currently available. First, it allows the tracking and monitoring of a plurality of individually identifiable samples passing through the process at substantially the same time. Even if the order of the samples changes as they pass through the process, the unique signal associated with each transponder provides the information to accurately establish the residence time of each sample. This capacity to measure residence times for a group of samples passing through the process substantially concurrently provides data which is statistically more valid and useful, since it simulates what really happened in the process with respect to residence time variations.

The risks involved in the proper control of aseptic processes for low-acid foods to avoid bacterial contamination are well known, as is the importance in measuring accurately residence times to properly control such processes. There is a vital need in the processing of such low-acid foods to have an inexpensive and statistically accurate means for determining and continuously monitoring residence times in such processes.

Even though the primary importance of accurate residence time determination is the production of a bacteria-free product, the quality of the process can also be maintained at a higher level through accurate residence time measurements. By making it possible to control the process accurately, any bacteria may be destroyed without resorting to overprocessing or overcooking of the product. This more precise control of the process results in a better food product. Accordingly, the present invention provides means for controlling the aseptic processing of low-acid foods to produce higher quality, bacterial-free food products.

While a preferred embodiment of the invention has been shown and described, it will be understood that there is no intent to limit the invention by such disclosure, but rather it is intended to cover all modifications and alternative methods falling within the spirit and scope of the invention as defined in the appended claims.

What is claimed is:

1. Apparatus for monitoring a continuous production process in which articles are transported in a stream in which the articles are moving at various velocities in changeable sequence and the processing of the articles is dependent on residence time comprising an elongated conduit within which articles are transported in a stream with said articles moving at different relative velocities and in different sequences with respect to one another.

said articles being processed within said conduit, a plurality of simulated articles which resemble said articles and each of which is equipped with a transponder, said transponder being responsive to an external signal to produce an identifying signal, means for inserting said simulated articles into said conduit to commingle said simulated articles with articles being processed in said stream, monitoring stations downstream of said means for inserting, each said monitoring station including signal generating means to generate said external signal to activate said transponders and signal receiving means to record each predetermined transponder identifying signal, said monitoring stations being located along said conduit at spaced positions between which the residence times of said articles are to be measured, and timing means connected to said monitoring stations providing a residence time for each simulated article passing said monitoring stations.

2. Apparatus for monitoring a continuous production process in accordance with claim 1 wherein each said transponder generates a different coded signal which distinguishes it from the other transponders for the purpose of providing each monitoring station with the time of arrival of a specific transponder to provide the timing means with the data to compute the transit time for each simulated article between the monitoring stations.

3. Apparatus for monitoring a continuous production process in accordance with claim 1, wherein said means for inserting said simulated articles includes a plurality of valves selectively operable to transfer a simulated article into said conduit which is pressurized to cause said stream of said articles to move through said conduit.

4. Apparatus for monitoring a continuous production process in accordance with claim 1 including means for separating said simulated articles from said articles being processed downstream of said monitoring stations, said means for separating including magnetic means to withdraw said simulated articles from said stream.

5. Apparatus for monitoring a continuous production process in accordance with claim 1 wherein said articles and simulated articles are transported by a fluid and each said simulated article has the same density as each said article being processed and whereby said simulated articles have a neutral buoyancy with respect to sand fluid stream.

6. A process for monitoring a stream of particles which comprise a mass of particles moving at various velocities in a changeable sequence comprising the steps of:

providing multiple simulated particles each having an implanted miniature transponder and each having physical characteristics similar to actual particles being processed so that the simulated particles will replicate the movement of the actual particles in moving through the process, each transponder sending a predetermined identifying signal when activated by a radiated signal, inserting said simulated particles into a stream of actual particles being processed and subjecting said simulated particles to the same processing as said actual particles, monitoring the time of passage of said simulated particles between two locations in said process by obtaining data on each individual simulated particle at each location.

7. A process for monitoring a stream of particles in accordance with claim 6 wherein said monitoring includes radiating a signal a each of said two locations and recording each transponder predetermined identifying signal and time of receipt at each of said two locations to determine the transit time of each simulated particle in passing between said two locations.

8. A process for monitoring a stream of food particles in accordance with claim 6 including the step of separating the simulated particles from the actual particles at a location downstream of said two locations.

9. A process for monitoring a stream of particles in accordance with claim 8 wherein said separating the simulated particles from the actual particles includes providing a magnetic means for withdrawing said simulated particles from said stream.

* * * * *